UNITED STATES PATENT OFFICE.

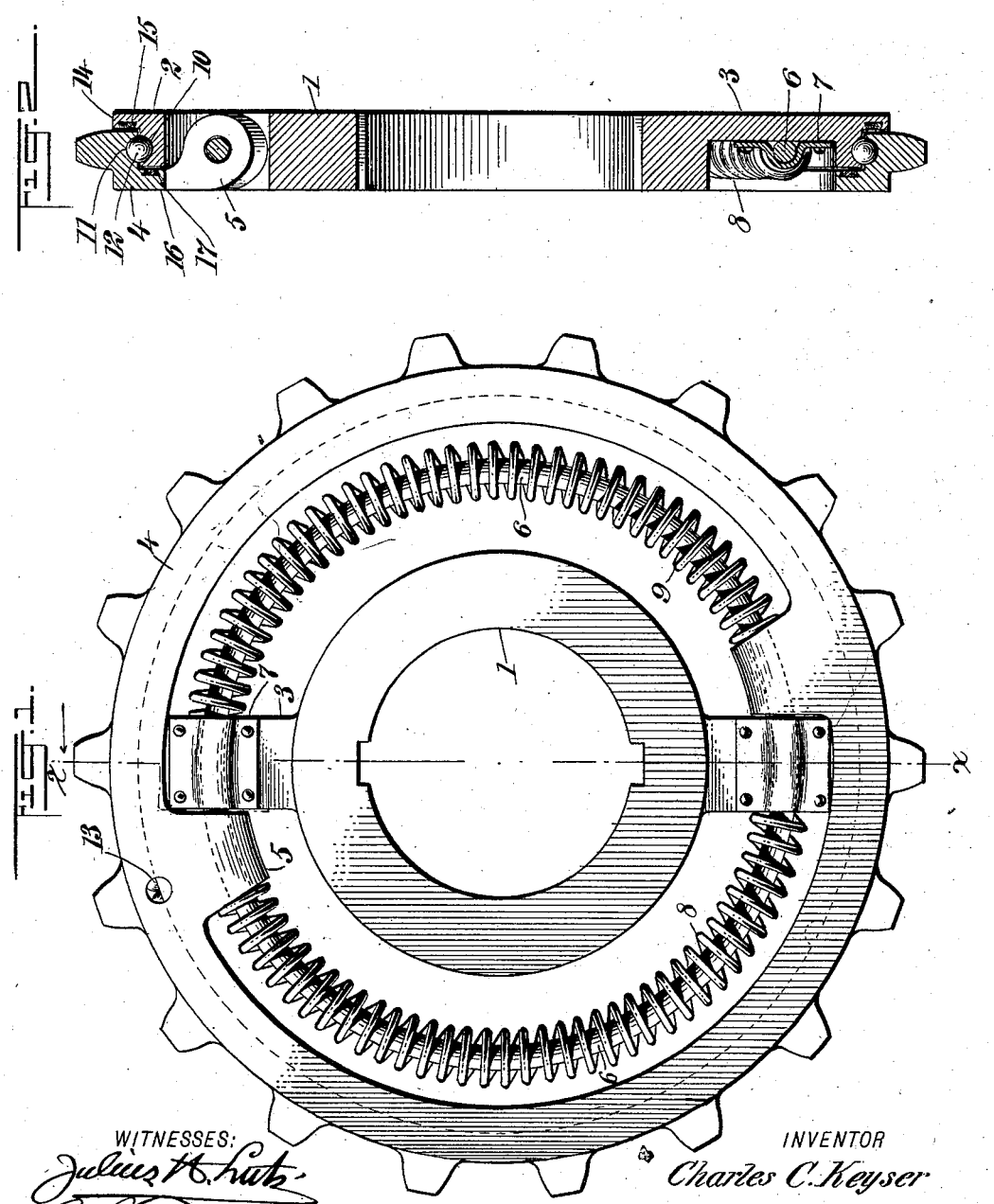

CHARLES CLANTON KEYSER, OF NEWPORT NEWS, VIRGINIA.

SPROCKET-WHEEL.

SPECIFICATION forming part of Letters Patent No. 720,442, dated February 10, 1903.

Application filed October 15, 1902. Serial No. 127,375. (No model.)

*To all whom it may concern:*

Be it known that I, CHARLES CLANTON KEYSER, a citizen of the United States, and a resident of Newport News, in the county of Warwick and State of Virginia, have invented new and useful Improvements in Sprocket-Wheels, of which the following is a full, clear, and exact description.

This invention relates to improvements in sprocket-wheels particularly adapted for use in connection with motor-bicycles or motor-vehicles; and the object is to provide a sprocket-wheel of simple construction and having spring-yielding parts, whereby the jarring or vibration is avoided while riding, starting, or stopping.

I will describe a sprocket-wheel embodying my invention and then point out the novel features in the appended claims.

Reference is to be had to the accompanying drawings, forming a part of this specification, in which similar characters of reference indicate corresponding parts in both the figures.

Figure 1 is a side elevation of a sprocket-wheel embodying my invention, and Fig. 2 is a section on the line $x$ $x$ in Fig. 1.

The sprocket-wheel comprises an inner ring 1, designed to be connected to the hub of the rear wheel, and an outer ring 2, connected to the inner ring 1 by means of arms 3. Mounted to move on the outer ring 2 is a toothed ring 4, having inwardly-extended lugs 5, which pass into the spaces between the arms 3 and at the opposite sides thereof, as clearly shown in Fig. 1. A ring 6 passes loosely through openings in the lugs 5 and is clamped to the arms 3 by means of the clips or plates 7, and surrounding this ring between the lugs 5 and the arms 3 are springs 8 9. By this arrangement upon starting the motor the outer ring or toothed member will have a slight spring-yielding-like motion, thus preventing a jar or shock and preventing the jerky motion so disagreeable in riding motor-cycles, &c.

The periphery of the ring 2 is provided with a raceway 10, and the inner periphery of the member 4 is provided with an annular raceway 11, and in the raceways bearing-balls 12 are placed. These bearing-balls may be inserted through an opening 13 formed in the side of the member 4. The ring 2 is provided at one end with a flange 14, which engages against the side of the member 4, and in this flange is formed a channel to receive a packing-ring 15, of felt or similar material. The flange portion 16 of the toothed member is also provided at its inner side with an annular channel, in which is placed a packing-ring 17, of felt or like material. These packing-rings will prevent the entrance of dirt or dust to the raceways and ball-bearings.

Having thus described my invention, I claim as new and desire to secure by Letters Patent—

1. A sprocket-wheel, comprising an inner ring and an outer ring, arms connecting the two rings, a toothed member mounted to move on the outer ring and having perforated lugs, a ring extended through the said lugs and clamped to the said arms, springs surrounding the ring and engaging with the said lugs and arms, and bearing-balls between the outer ring and the toothed member.

2. A sprocket-wheel comprising an inner ring and an outer ring, arms connecting the two rings, a toothed member mounted to move on the outer ring and having perforated lugs, a ring extended through said lugs and clamped to said arms, and springs surrounding the ring and engaging with said lugs and arms.

3. A sprocket-wheel comprising an inner ring and an outer ring, arm connections between said rings, a toothed member mounted to move on the outer ring and having inwardly-extended perforated lugs, a ring passing loosely through said lugs and clamped to the arms, springs arranged between the lugs and arms and packing-rings arranged between the said outer ring and the toothed member.

In testimony whereof I have signed my name to this specification in the presence of two subscribing witnesses.

CHARLES CLANTON KEYSER.

Witnesses:
H. P. HAMMOND,
S. BRUCE TABB.